United States Patent
Wilhelmsson et al.

(10) Patent No.: US 11,445,442 B2
(45) Date of Patent: Sep. 13, 2022

(54) EFFICIENT CONCURRENT TRANSMISSION OF A WAKE-UP SIGNAL AND USER DATA

(71) Applicant: Telefonaktiebolaget LM Ericsson (publ), Stockholm (SE)

(72) Inventors: Leif Wilhelmsson, Dalby (SE); Miguel Lopez, Solna (SE); Sven Mattisson, Bjärred (SE); Thomas Nilsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 157 days.

(21) Appl. No.: 16/319,438

(22) PCT Filed: Jul. 14, 2017

(86) PCT No.: PCT/SE2017/050782
§ 371 (c)(1),
(2) Date: Jan. 21, 2019

(87) PCT Pub. No.: WO2018/017008
PCT Pub. Date: Jan. 25, 2018

(65) Prior Publication Data
US 2020/0084718 A1    Mar. 12, 2020

Related U.S. Application Data

(60) Provisional application No. 62/365,581, filed on Jul. 22, 2016.

(51) Int. Cl.
*H04W 52/02* (2009.01)
*H04L 5/00* (2006.01)

(52) U.S. Cl.
CPC ....... *H04W 52/0229* (2013.01); *H04L 5/0007* (2013.01); *H04L 5/0039* (2013.01); *H04L 5/0044* (2013.01); *H04W 52/028* (2013.01)

(58) Field of Classification Search
CPC ............ H04W 52/0229; H04W 52/028; H04L 5/0007; H04L 5/0039; H04L 5/0044; Y02D 30/70
See application file for complete search history.

(56) References Cited

U.S. PATENT DOCUMENTS

| | | |
|---|---|---|
| 5,245,346 A | 9/1993 | Nishimura et al. |
| 9,107,164 B1 | 8/2015 | Troyanker et al. |

(Continued)

FOREIGN PATENT DOCUMENTS

| | | |
|---|---|---|
| EP | 2680522 A1 | 1/2014 |
| WO | 2006020125 A2 | 2/2006 |

(Continued)

*Primary Examiner* — Gary Mui
*Assistant Examiner* — Mohammed M Murshid
(74) *Attorney, Agent, or Firm* — Murphy, Bilak & Homiller, PLLC

(57) ABSTRACT

In one aspect, a transmitting device may frequency-division multiplex a wake-up signature (WUS) targeted to a wake-up receiver (WUR) of a receiving device with user data targeted to a main transceiver of each of one or more other receiving devices into an output signal. The output signal is then transmitted. A receiving device having a WUR and a main transceiver of the receiving device detects, at the WUR, a WUS targeted for the WUR in a received signal. The WUS is frequency-division multiplexed with user data for one or more other receiving devices in the received signal. The receiving device wakes up the main transceiver in response to the detecting.

15 Claims, 14 Drawing Sheets

(56) References Cited

U.S. PATENT DOCUMENTS

| | | | |
|---|---|---|---|
| 9,525,540 B1 | 12/2016 | Shellhammer et al. | |
| 10,298,377 B2* | 5/2019 | Shin | H04B 7/0691 |
| 2004/0057509 A1* | 3/2004 | Porat | H04L 12/12 |
| | | | 375/222 |
| 2010/0112950 A1 | 5/2010 | Haartsen et al. | |
| 2010/0177717 A1* | 7/2010 | Sung | H04W 72/042 |
| | | | 370/329 |
| 2010/0246561 A1* | 9/2010 | Shin | H04B 7/0691 |
| | | | 375/267 |
| 2010/0329363 A1 | 12/2010 | Ng et al. | |
| 2011/0009059 A1 | 1/2011 | Camp et al. | |
| 2013/0188564 A1* | 7/2013 | Yu | H04W 72/1247 |
| | | | 370/329 |
| 2014/0050133 A1* | 2/2014 | Jafarian | H04W 74/085 |
| | | | 370/311 |
| 2014/0149758 A1 | 5/2014 | Rajkotia | |
| 2014/0211678 A1 | 7/2014 | Jafarian et al. | |
| 2014/0269462 A1 | 9/2014 | Jia et al. | |
| 2016/0047884 A1 | 2/2016 | Zhang et al. | |
| 2016/0119865 A1* | 4/2016 | Kennedy | H04W 28/0221 |
| | | | 370/311 |
| 2016/0373237 A1* | 12/2016 | Shellhammer | H04W 52/0229 |
| 2016/0374021 A1 | 12/2016 | Alpman et al. | |
| 2016/0374022 A1 | 12/2016 | Ang et al. | |
| 2017/0111858 A1 | 4/2017 | Azizi et al. | |
| 2017/0111894 A1* | 4/2017 | Chen | H04W 72/0413 |
| 2017/0181090 A1* | 6/2017 | Park | H04L 5/0092 |
| 2018/0255515 A1 | 9/2018 | Gupta Hyde et al. | |

FOREIGN PATENT DOCUMENTS

| | | | |
|---|---|---|---|
| WO | 2015026803 | A1 | 2/2015 |
| WO | 2018017008 | A1 | 1/2018 |

* cited by examiner

EFFICIENT CONCURRENT TRANSMISSION OF A WAKE-UP SIGNAL AND USER DATA

TECHNICAL FIELD

The present invention generally relates to wireless communication networks, and particularly relates to multiplexing transmissions of wake-up signals and user data in an efficient way, for a receiving device that has a wake-up receiver and a main transceiver, where the wake-up receiver uses less power than the main transceiver to listen for a wake-up signature, in order to wake up the main transceiver to receive user data.

BACKGROUND

The so-called Internet of Things (IoT) is expected to increase the number of connected devices significantly. A vast majority of these devices will likely operate in unlicensed bands, such as the 2.4 GHz ISM band. At the same time, there is also increased demand for using the unlicensed bands for services that traditionally have been supported in licensed bands. As an example, the Third Generation Partnership Project (3GPP), which has developed several wireless communications standards for licensed bands, has now also developed versions of Long Term Evolution (LTE) that will operate in the 5 GHz unlicensed band.

A large number of IoT devices are expected to be powered by small batteries, which means that energy consumption is of utmost importance. In the future, these devices may be able to harvest their energy themselves, further increasing the importance of low energy consumption.

For these kind of applications, the supported data rates are low, both concerning peak data rates and an aggregated data rate during an average day. This means that a major part of the power is not consumed when the IoT device is transmitting or receiving data, but rather when the devices are listening to determine whether there might be a transmission for which it is the intended receiver.

The fact that such a large part of the total energy consumption is due to listening for a potential transmission, just to find out that the transmission is not there, has motivated the development of so-called wake-up receivers (WUR). A WUR is a device that has extremely low power consumption and whose only purpose is to wake up the main transceiver. So, an IoT device with a WUR will not need to turn on the main receiver to scan for a potential packet, but will instead turn on the WUR. If in fact there is data for the IoT device, a wake-up signature (WUS) will be sent to the WUR. When the WUR has decoded this WUS, and determined that there in fact is data present, it will then wake up the main receiver and transmitter, and a communication link can be established.

Although the power consumption for WUR is very low, it also comes with some short-comings. For example, the WUR performance typically is much worse than the performance of the "main" receiver that handles actual data transmissions, both concerning sensitivity and selectivity. That is, the range for a WUR is often considerably smaller than for the main receiver, although one can reduce the difference due to the fact that the data rate for the WUS may typically be much lower than for the main receiver used for actual data. The reduced selectivity comes from the difficulty of generating a precise frequency reference that can be used for down-conversion of the signal, and thus it is not feasible to have a narrow-band selectivity filter. This, in turn, means that interfering signals that are relatively far from the WUR in frequency can still degrade its sensitivity significantly.

It is recognized herein that when WURs are to be used, there are two more problems, in addition to the potential loss in sensitivity. The first problem is when a WUS is sent in-band, i.e., in the same frequency band as is used for the actual data. The duration of the WUS needs to be rather long to ensure that it can be received. This means that for a relatively large part of the time, the channel cannot be used for data transmission. The second problem relates to the situation when the WUS is sent in an unlicensed band, where the interference situation is not under control by the network. If the WUS is interfered with, the WUR will most likely not be able to receive the WUS correctly.

SUMMARY

Various embodiments described herein provide for transmitting the WUS concurrently with user data by means of multiplexing techniques like OFDMA. These embodiments address at least the two additional problems mentioned above. First, since user data is multiplexed with the WUS, the channel is used more efficiently. Second, since user data is transmitted at the same time as the WUS, potentially interfering devices that are using some kind of carrier sense multiple access with collision avoidance (CSMA/CA) will more likely find the channel to be busy and therefore defer from initiating a transmission.

According to some embodiments, a method in a transmitting device includes frequency-division multiplexing a WUS targeted to a WUR of a first receiving device with user data targeted to a main transceiver of each of one or more other receiving devices into an output signal. The method also includes transmitting the output signal.

According to some embodiments, a method in a receiving device having a WUR and a main transceiver, where the WUR uses less power than the main transceiver to listen for the WUS in order to wake up the main transceiver to receive user data, includes detecting, at the WUR, a WUS targeted for the WUR in a received signal. The WUS is frequency-division multiplexed with user data for one or more other receiving devices. The method also includes waking up the main transceiver in response to the detecting.

According to some embodiments, a transmitting device includes transceiver circuitry configured to receive and transmit signals and processing circuitry operatively associated with the transceiver circuitry. The processing circuitry is configured to frequency-division multiplex a WUS targeted to a WUR of a first receiving device with user data targeted to a main transceiver of each of one or more other receiving devices into an output signal and transmit the output signal.

According to some embodiments, a receiving device includes main transceiver circuitry and a WUR circuit, where the WUR circuit uses less power than the main transceiver to listen for the WUS in order to wake up the main transceiver to receive user data. The receiving device also includes processing circuitry operatively associated with the main transceiver circuitry and the WUR circuit. The processing circuitry is configured to detect, at the WUR circuit, a WUS targeted for the WUR circuit in a received signal, where the WUS is frequency-division multiplexed with user data for one or more other receiving devices. The processing circuitry is also configured to wake up the main transceiver in response to the detecting.

According to some embodiments, a non-transitory computer readable storage medium storing a computer program comprising program instructions that, when executed on a processing circuit of a transmitting device, cause the transmitting device to frequency-division multiplex a WUS, targeted to a WUR of a first receiving device with user data targeted to a main transceiver of each of one or more other receiving devices into an output signal and transmit the output signal.

According to some embodiments, a non-transitory computer readable storage medium storing a computer program comprising program instructions that, when executed on a processing circuit of a receiving device having a WUR and a main transceiver, where the WUR uses less power than the main transceiver to listen for the WUS in order to wake up the main transceiver to receive user data, cause the receiving device to detect, at the WUR, a WUS, targeted for the WUR in a received signal, where the WUS is frequency-division multiplexed with user data for one or more other receiving devices in the received signal. The instructions also cause the processing circuit to wake up the main transceiver in response to the detecting.

The method may also be implemented by apparatus, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

DETAILED DESCRIPTION

Embodiments of the present invention provide for spectrum efficient use of WURs. They also provide for an improved performance of the WURs, in the sense that the disclosed techniques reduce the likelihood for the WUS to suffer from interference.

For example, to reduce inefficiencies when using a WUR, a transmitting device may frequency-division multiplex a WUS targeted to a WUR of a receiving device with user data targeted to a main transceiver of each of one or more other receiving devices into an output signal. The output signal is then transmitted. A receiving device having a WUR and a main transceiver of the receiving device detects, at the WUR, a WUS targeted for the WUR in a received signal. The receiving device wakes up the main transceiver in response to the detecting.

Figure 1:
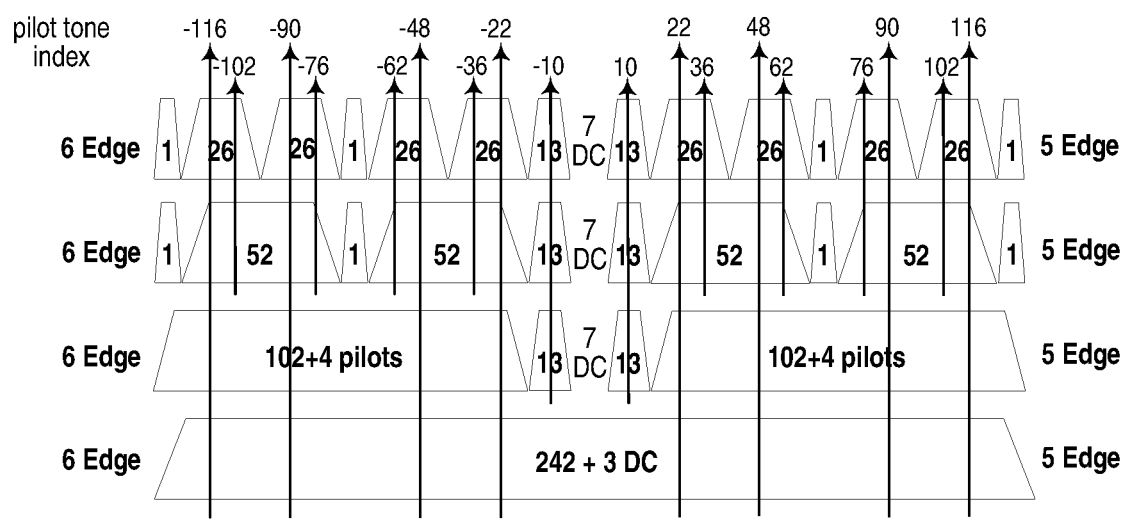
FIG. 1 is an illustration of how different resource units can be shared between two or more users according to the IEEE 802.11ax standard.
Figure 2:
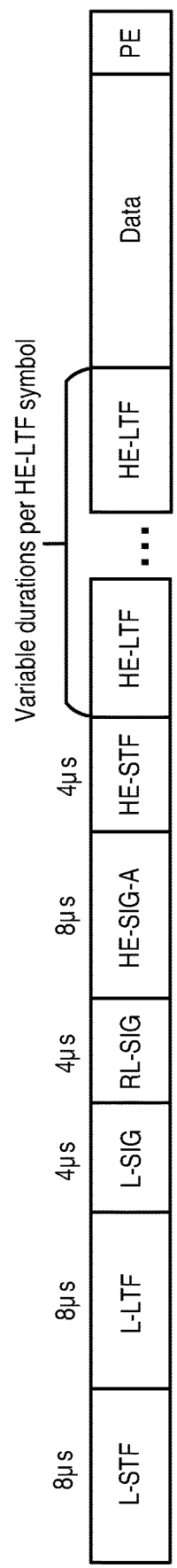
FIG. 2 is a block diagram of an illustration of a packet format used in IEEE 802.11ax.

Such a system may be based on IEEE 802.11ax and operate in the 2.4 GHz ISM band. Moreover, suppose that the channel bandwidth used is 20 MHz. In IEEE802.11ax, orthogonal frequency division multiple access (OFDMA) may be used to transmit to several users concurrently in the downlink and to receive from several users concurrently in the uplink. FIG. 1 shows various ways for how the bandwidth in a 20 MHz channel may be divided among users. A user can here only be allocated to one resource unit (RU), but the size of the RU may be 26, 52, 106, or 242 subcarriers. The options for sharing the channel between users are the same for both the downlink and the uplink. FIG. 1 illustrates how different RUs can be shared between two or more users according to the IEEE 802.11ax standard. An example of a packet compliant with the IEEE 802.11ax standard is shown in FIG. 2. The packet structure may differ slightly depending on the exact contents of the packet, but many of the fields are the same. These fields will be explained later.

Figure 3:
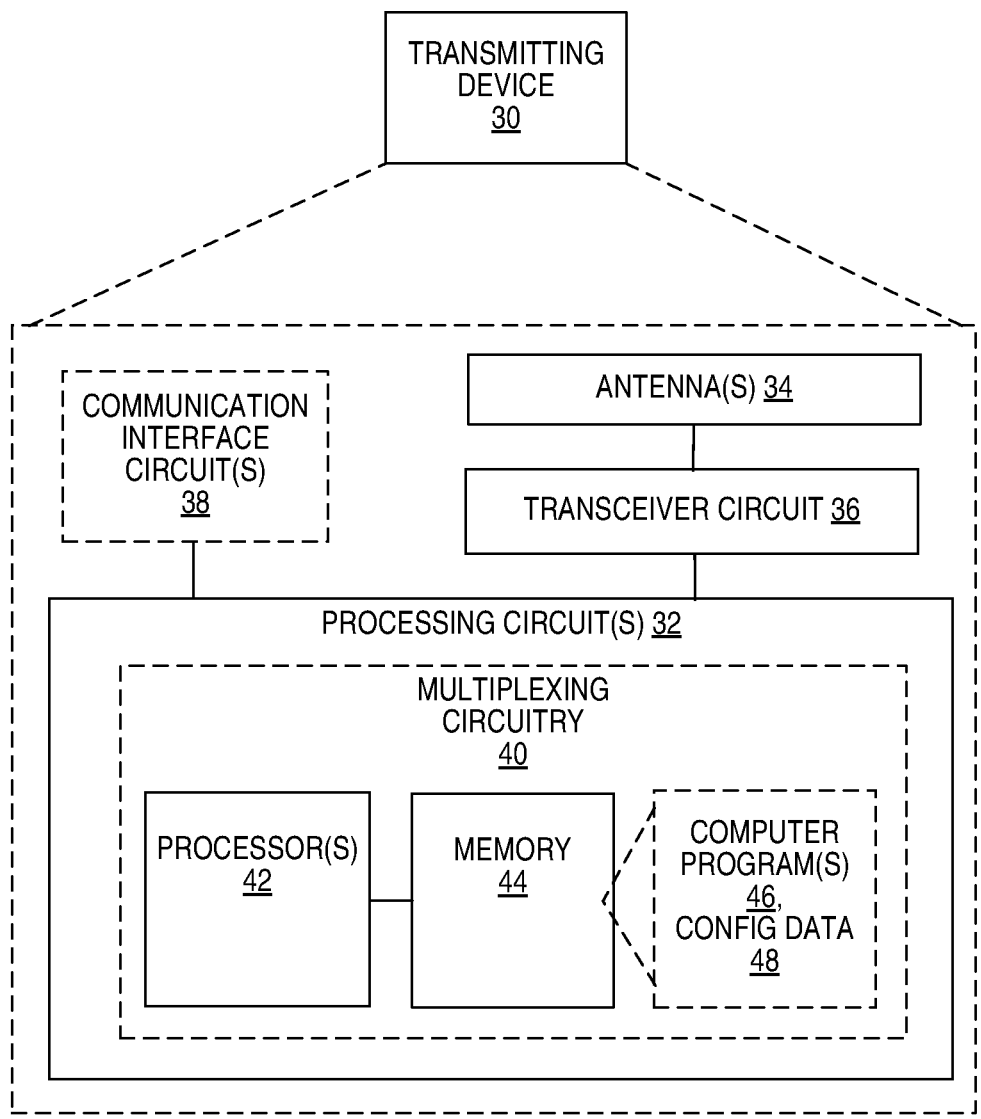
FIG. 3 is a block diagram illustrating an example transmitting device, according to some embodiments.

FIG. 3 illustrates an example transmitting device 30, according to some embodiments. The transmitting device 30 may be a radio access network node that facilitates communication between UEs and the core network. In using the generic terminology of "radio access network node," a radio access network node can be a base station, radio base station, base transceiver station, base station controller, network controller, evolved Node B (eNB), Node B, relay node, access point (AP), radio access point, Remote Radio Unit (RRU) or Remote Radio Head (RRH). In the case where the transmitting device is a radio access network node, the radio access network node may include a communication interface circuit 38 that includes circuitry for communicating with other nodes in the core network, radio nodes, and/or other types of nodes in the network for the purposes of providing data and cellular communication services.

The transmitting device 30 may also be a wireless device, such as a device in Internet of Things (IoT), a user equipment or any wireless device that may utilize Carrier Aggregation (CA) or License Assisted Access (LAA) in a network. Examples of a wireless device include a radio communication device, target device (device targeted for communication), device to device (D2D) UE, machine type UE or UE capable of machine to machine communication (M2M), sensor equipped with UE, iPAD, tablet, mobile terminals, smart phone, laptop embedded equipped (LEE), laptop mounted equipment (LME), USB dongles, Customer Premises Equipment (CPE), etc.

The transmitting device 30 communicates with other devices via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, general packet radio service (GPRS), wideband code division multiple access (WCDMA), high-speed downlink packet access (HSDPA), LTE and LTE-Advanced. The transceiver circuit 36 may also operate according to other technologies, such as Wi-Fi, BLUETOOTH and ZIGBEE technologies.

The transmitting device 30 also includes one or more processing circuits 32 that are operatively associated with the transceiver circuit 36 to communicate with other devices and, in some cases, operatively associated with the communication interface circuit 38 to communicate with network nodes. The communication may include multi-carrier operations. The term "multi-carrier" may involve similar terms such as "multi-carrier system", "multi-cell operation", "multi-carrier operation", and "multi-carrier" transmission and/or reception. Multi-carrier operation may also be considered to involve CA.

For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the transmitting device 30. Here, "non-transitory" means permanent, semi-permanent, or at least temporarily persistent storage and encompasses both long-term storage in non-volatile memory and storage in working memory, e.g., for program execution.

In some embodiments, the processor 42 of the processing circuit 32 executes a computer program 46 stored in the memory 44 that configures the processor 42 to frequency-division multiplex a WUS targeted to a WUR of a first receiving device with user data targeted to a main transceiver of each of one or more other receiving devices into an output signal and transmit the output signal. This functionality may be performed by multiplexing circuitry 40 in processing circuit 32. While this example discusses the targeting of a WUR, this is not limited to targeting a single WUR. Multiple WURs may be targeted.

Figure 4:
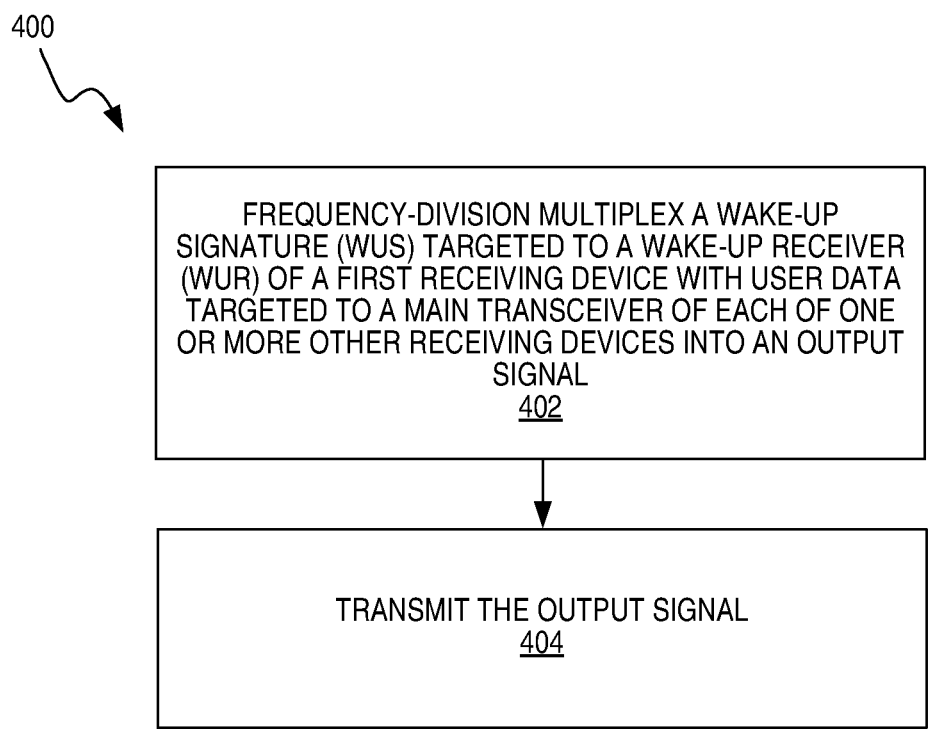
FIG. 4 shows a flow chart illustrating a method of multiplexing a WUS and user data, according to some embodiments.

The processing circuit 32 of the transmitting device 30 is configured to perform various methods, such as method 400 of FIG. 4. The method 400 includes frequency-division multiplexing a WUS targeted to a WUR of a first receiving device with user data targeted to a main transceiver of each of one or more other receiving devices into an output signal (block 402) and transmitting the output signal (block 404).

The method 400 may include modulating the WUS using on-off keying (OOK) to obtain an OOK signal, such that the OOK signal occupies a first frequency range of the output signal and the frequency-division multiplexed user data occupies a second frequency range of the output signal.

The method 400 may also include frequency-division multiplexing the WUS with user data by generating an OFDM signal in which the user data is carried by one or more resource units of the OFDM signal, and multiplexing the WUS signal in one or more other resource units of the OFDM signal, each resource unit comprising one or more subcarriers of the OFDM signal. This may include modulating the WUS by: generating a first logical bit value (e.g., a logical zero) for each of one or more WUS symbol durations by blanking subcarriers of a resource unit allocated to the WUS, for the respective WUS symbol duration, and generating a second logical bit value (e.g., a logical one) for each of one or more other WUS symbol durations by transmitting one or more, possibly arbitrary, constellation symbols with predetermined powers in subcarriers of the resource unit allocated to the WUS, for the respective symbol duration. Where OFDMA is used for multiplexing, the symbol duration of the WUS symbol will be same as the OFDM symbol duration, by construction. More generally, it is possible for the WUS symbol durations to be less than the frequency-division multiplexing (FDM) symbol durations for the transmitted user data.

In some cases, the frequency-division multiplexing includes allocating multiple resource units for the user data for every one resource unit allocated for the WUS. In some cases, the frequency-division multiplexing includes boosting a power of the WUS resource units relative to a power of the user data resource units, based on a length of a symbol used for the WUS. The frequency-division multiplexing may include sending the WUS on a middle resource unit while sending the user data on resource units surrounding the middle resource unit. The frequency-division multiplexing may also include changing, from one time interval to another, a resource unit used for sending the WUS, so as to obtain frequency diversity.

In some cases, the frequency-division multiplexing includes allocating multiple resource units for sending the WUS. The frequency-division multiplexing may also include allocating multiple resource units for sending the WUS that are not contiguous in the frequency domain, and a number of the multiple resource units for sending the WUS change from one packet to the next depending on channel conditions experienced by the WUR and a number of users that need to be served.

Figure 5:
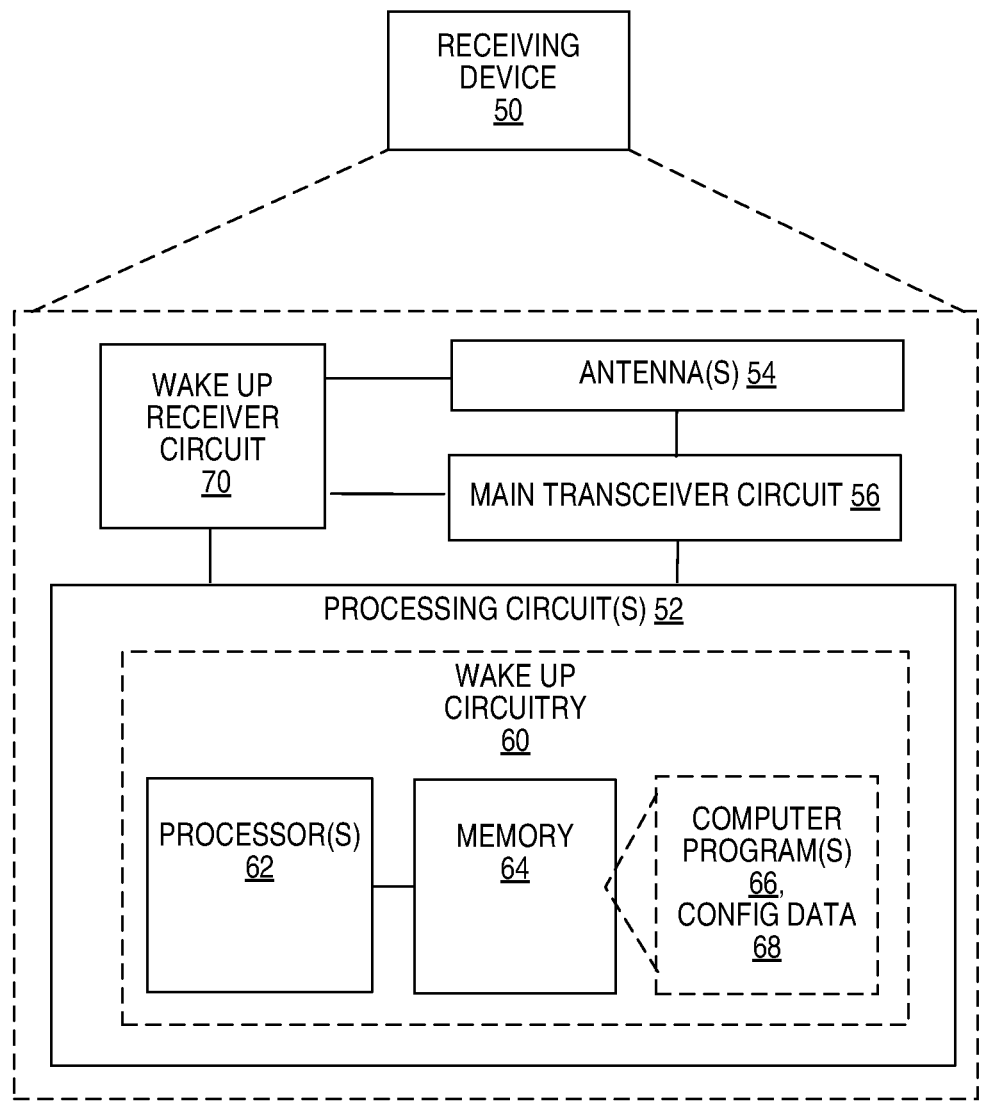
FIG. 5 is a block diagram illustrating an example receiving device, according to some embodiments.

To complement the transmitting device 30 of FIG. 3, FIG. 5 illustrates a block diagram of a receiving device 50, according to some embodiments. The receiving device 50 may also be a wireless device, such as a device in the IoT, a user equipment or any wireless device that may utilize CA or LAA in a network. Examples of a wireless device were provided above in the discussion of transmitting device 30.

The receiving device 50 communicates with transmitting device 30, via antennas 54 and a main transceiver circuit 56. The main transceiver circuit 56 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced. The main transceiver circuit 56 may communicate via other technologies such as Wi-Fi, BLUETOOTH and ZIGBEE technologies. The main transceiver circuit 56 is used to receive user data.

The receiving device 50 also includes a WUR 70 that operates with less power than the main transceiver circuit 56. The WUR 70 operates to listen for and detect a signal with a WUS. The WUR 70 is configured to, upon detection of such a signal, wake up the main transceiver circuit 56. The WUR 70 is configured to utilize one or more of various technologies or protocols for communications, including one or more of those utilized by the main transceiver circuit 56.

The receiving device 50 includes one or more processing circuits 52 that are operatively associated with the main transceiver circuit 56 and the WUR 70. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

In some embodiments, the processor 62 of the processing circuit 52 may execute a computer program 66 stored in the memory 64 that configures the processor 62 to detect, at the WUR, a WUS targeted for the WUR in a received signal, where the WUS is frequency-division multiplexed with user data for one or more other receiving devices. The processing circuit 52 is also configured to wake up the main transceiver in response to the detecting. This functionality and other described functions may be performed by wake up circuitry 60.

Figure 6:
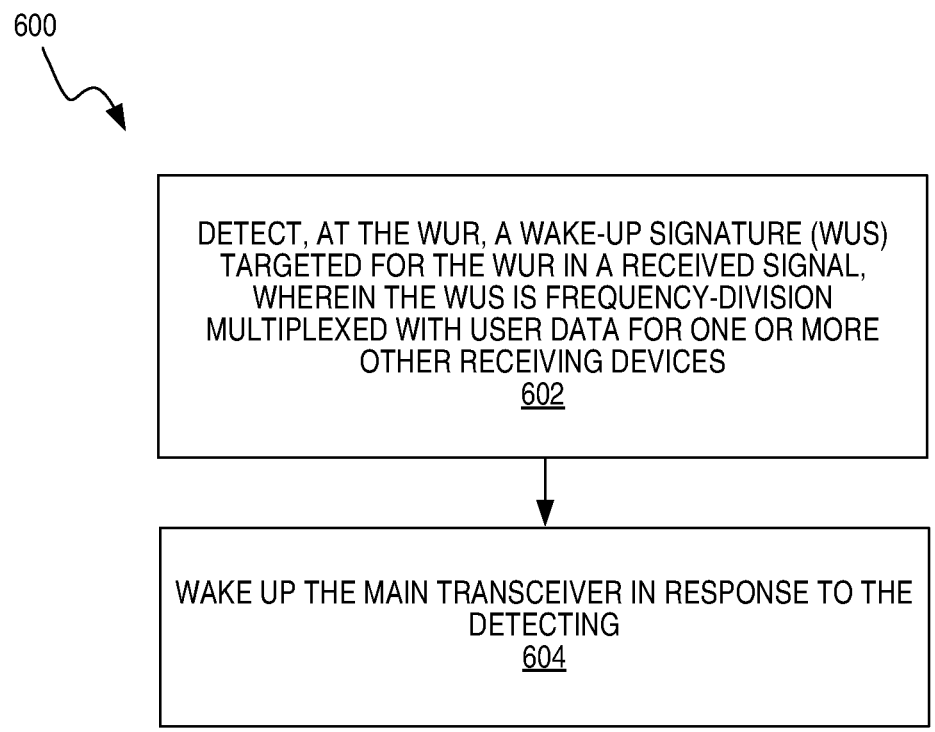
FIG. 6 shows a flow chart illustrating a method of waking up a main transceiver, according to some embodiments.

Likewise, the processing circuit 52 is configured to perform a method such as method 600 illustrated by FIG. 6. The method 600 includes detecting, at the WUR, a WUS targeted for the WUR in a received signal, where the WUS is frequency-division multiplexed with user data for one or more other receiving devices (block 602). The method 600 also includes waking up the main transceiver in response to the detecting (block 604). The method 600 may also include subsequently detecting user data in the received signal.

Briefly returning to FIG. 2, different packet fields compliant with the IEEE 802.11ax standard may include the following:

L-STF, L-LTF, and L-SIG: These three fields are known as the legacy preamble (L-stands for legacy). It can also be understood by devices not compliant with IEEE 802.11ax and ensures that also these legacy devices will defer from channel access, i.e., the CSMA/CA still works as expected. The legacy preamble is sent over the full 20 MHz bandwidth. Although different implementations may process the fields slightly differently, the basic idea is that the L-STF is used for time and frequency synchronization, the L-LTF is used for channel estimation, which is needed to demodulate the L-SIG field that contains information that, for example, can be used to determine the length of the packet.

RL-SIG: Is just a Repetition of the L-SIG.

HE-SIG-A: Contains information required to interpret the HE-PPDU. HE-SIG-A is also sent over the full 20 MHz. HE-SIG-A contains information useful (common) for all users addressed in the packet, and thus a device processes the entire 20 MHz.

HE-LTF is used for channel estimation, and thus if a device is only allocated to a fraction of the total 20 MHz, that device will only process the part of the HE-LTF to which it has been allocated and where it later will find its data in the packet. What is noteworthy is that once a device has identified to what part of the channel or what RU it has been allocated, it does not matter what is sent on the remaining RUs.

The Data field may contain information to the different users addressed in this packet. What devices are addressed may vary from one packet to the next.

Figure 7:
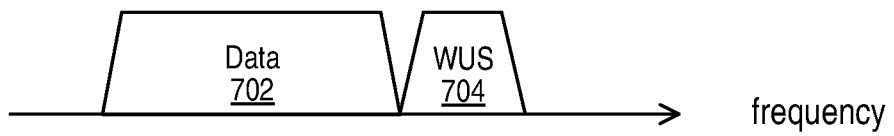
FIG. 7 is an illustration of how the WUS is sent concurrently, and adjacent in frequency, with data using FDMA.

In a first additional example embodiment, the WUS is modulated using on-off keying (OOK) and transmitted concurrently with the user data using frequency division multiplexing. That is, the WUS and the user data may be allocated to different parts of the frequency spectrum, but within the same channel or essentially within the same channel in the sense that the WUS is allocated to a part of the spectrum that may otherwise be used as a guard band. Specifically, the WUS and data may be transmitted so close in frequency (adjacent to each other) that the data signal will impact the demodulation of the WUS and thus this should be considered when generating the composite signal. FIG. 7 illustrates how the WUS 704 is sent concurrently, and adjacent in frequency, with data 702 using frequency division multiple access (FDMA).

The reception of the data is typically not a problem as the receiver contains a channel selective filter (CSF) that will attenuate signals outside of the data signals passband. Specifically, the WUS will be sufficiently attenuated before the actual demodulation of the data is performed. Moreover, since both the data and WUS are sent from the same transmitter, it is possible to quite accurately determine exactly how much interference the WUS will cause.

Figure 8:
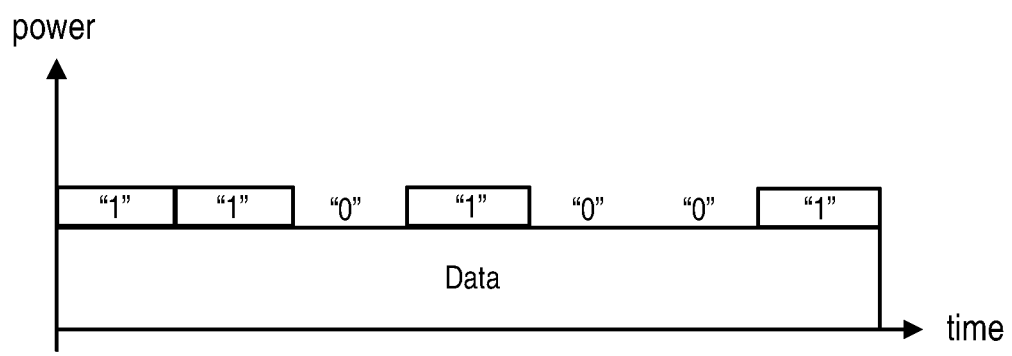
FIG. 8 illustrates the total power as a function of the information in the WUS, according to some embodiments.

The reception of the WUS is more of a problem as the data signal cannot be filtered out in a corresponding way. Instead, the reception of the WUS is based on the fact that the total power of the composite signal (data+WUS), will reflect whether the WUS is on or off. Schematically, this is illustrated in FIG. 8. Note that from the point of view of the WUR, the received signal has been modulated using a form of binary Amplitude Shift Keying (ASK), where both a logical "0" and a logical "1" are represented by two different, non-zero, power levels. The reason is that the data has a positive average power, so the energy received by the WUR is always greater than zero. Observe also that OOK is a special form of binary ASK, where one of the energy levels is zero.

Any suitable way to differentiate between whether the WUS is on or off may be considered as feasible for a WUR. However, the most commonly used architecture for a WUR is based on an envelope detector, and the idea is then that fast variations due to the carrier frequency can be filtered out by low pass filtering and the envelope of the signal then corresponds to the WUS being based on OOK.

In this embodiment, the idea is extended as follows. Instead of just modulating a carrier using OOK, the OOK signal is multiplexed with random data, or the arbitrary data symbols targeted to other users. However, just as a low pass filter (LPF) can filter out the carrier, the device exploits the fact that this random or arbitrary data has much higher frequency components than the WUS using OOK. Therefore, the composite signal, including both the random data and the WUS, can be used to detect the WUS, leveraging on the fact that the LPF effectively will suppress the high frequency components of the data part of the composite signal.

Intuitively, it will become easier to detect the WUS when the power allocated to the WUS relative to the signal carrying the data is increased. Therefore, this embodiment also covers features where the power offset between the WUS and the data are selected to give a good performance for both the data link and the WUR. Details for such trade-offs are discussed in relation to a second example embodiment to be discussed later, but are applicable also to this embodiment.

Figure 9:
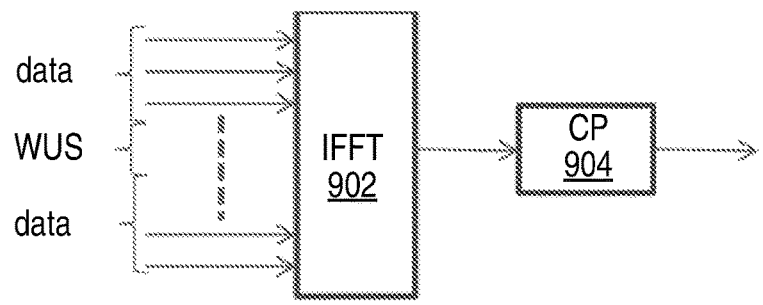
FIG. 9 illustrates how the WUS is generated together with the data signal using an IFFT, according to some embodiments.

According to the second additional example embodiment, the frequency division multiplexing is achieved by means of orthogonal frequency-division multiple access (OFDMA). Specifically, both the WUS and the data are generated concurrently using an inverse fast Fourier transform (IFFT). FIG. 9 illustrates how the WUS is generated together with the data signal using an IFFT 902.

When the composite signal is generated as depicted in FIG. 9, the symbol rate of the WUS will be the same as symbol rate of the OFDM system used for data. OOK is easily implemented as follows. A logical "0" is generated by blanking the subcarriers allocated to the WUS during the whole duration of one OFDM symbol (including the cyclic prefix added by CP 904). That is, an output may be "blanked" during the duration of the IFFT output when no input is provided at a subcarrier prior to the IFFT operation. A logical "1" is generated by transmitting (possibly arbitrary) constellation symbols (e.g., QAM symbols), having a predetermined power, during the duration of one OFDM symbol (including the cyclic prefix).

Figure 10:
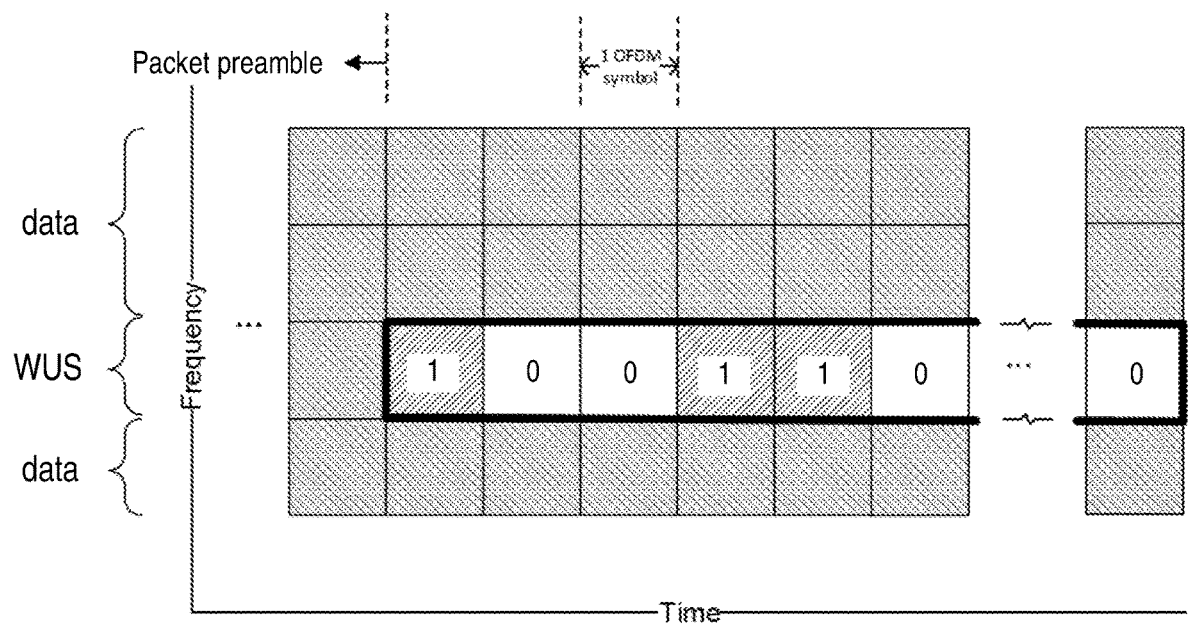
FIG. 10 illustrates generation of the WUS in an OFDM/OFDMA system, according to some embodiments.

FIG. 10 illustrates generation of the WUS in an OFDM/OFDMA system by means of the IFFT 902. Data and WUS are transmitted concurrently. In this example, three RUs are allocated to data and one RU is allocated to the WUS. The WUS is enclosed by a thick black line for illustrative purposes. A logical "0" is generated by blanking the subcarriers allocated to the WUS, for the duration of one OFDM symbol. A logical "1" is generated by transmitting arbitrary constellation symbols in the subcarriers allocated to the WUS, for the duration of one OFDM symbol. Of course, the logical bit values "1" and "0" may be assigned in the opposite manner, in some embodiments.

To provide some numerical examples, suppose that the OFDM system would use the same parameters as in used in 802.11n and 802.11ac. Then, for a 20 MHz channel, the sampling rate would be 20 MHz and a 64 points IFFT would be employed. This means that the duration of one OFDM symbol without the cyclic prefix becomes 64/(20 10^6)=3.2 us. Furthermore, the most commonly used length of the cyclic prefix is 800 ns, so that the total duration for an OFDM symbol including the cyclic prefix becomes 4 us. The symbol rate for the WUS would consequently be 250 kb/s.

One of the very desirable features of this second additional embodiment compared to the first additional embodiment is that the WUS by construction is made orthogonal to the data signal, and thus in terms of interference, the WUS signal can be sent at a (much) higher power than is used for the data without causing any degradation. The only (minor) degradation that will be experienced comes from the transmitted power of the data having to be slightly reduced if the WUS is boosted in power, assuming the total transmitted power should be kept the same.

Figure 11:
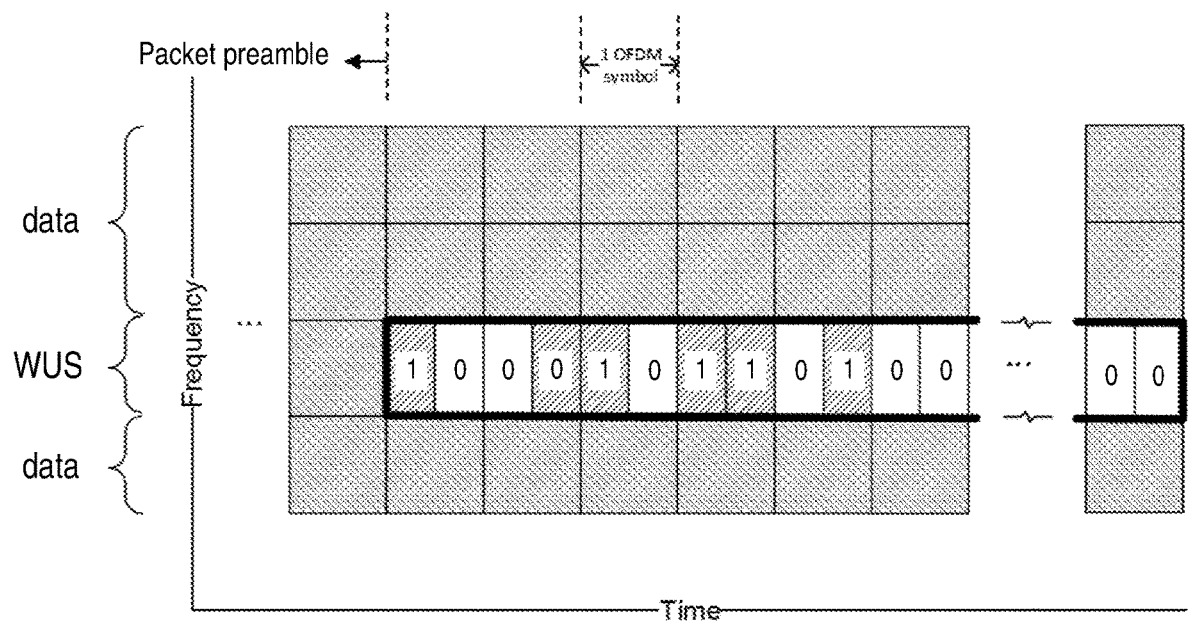
FIG. 11 illustrates generation of the WUS, according to some embodiments.

It is possible to increase the bit rate of the WUS by diminishing the symbol duration to fractions of one OFDM symbol (e.g., shortening the symbol time to ½ or ¼ of the OFDM symbol duration). This breaks the orthogonality between the WUS and the data, but it is useful as long as the performance degradation suffered by the data is small. This is illustrated in FIG. 11. The user data and the WUS are transmitted concurrently, and in this example, two WUS symbols are transmitted for each OFDM data symbol. A logical "0" is generated by blanking the subcarriers allocated to the WUS, for the duration of one OFDM symbol. A logical "1" is generated by transmitting arbitrary constellation symbols in the subcarriers allocated to the WUS, for the duration of one OFDM symbol.

Figure 12A:
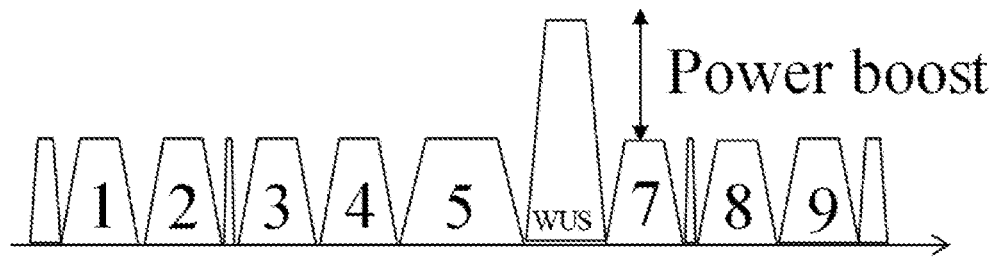
FIG. 12A illustrates a power boost of the WUS, according to some embodiments.
Figure 12B:
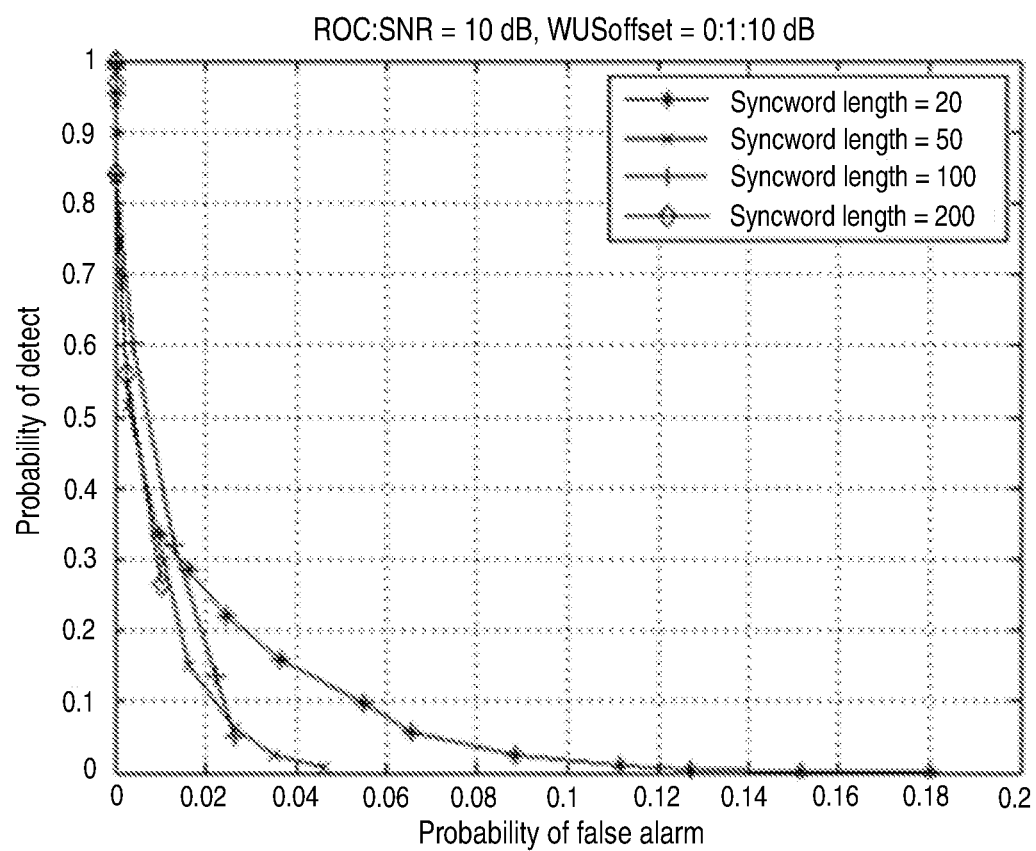
FIG. 12B illustrates performance of the WUR as a function of power offset of the WUS and the length of the WUS, according to some embodiments.

On the other hand, it may be helpful to use power boosting of the WUS for the WUR, as the data signal is seen as interference for the WUR. An example of such power boosting of the WUS is shown in FIG. 12A. Normally, the WUS contains a sequence that the WUR tries to detect by means of correlation. The longer the sequence, the better the performance. There are, however, a few reasons why making the WUS too long in duration is not desirable. First, if it is generated as depicted in FIG. 10, it is desirable that the duration of the data part of the packet is as long as the duration of the WUS. If the data part in fact is longer, that would not be a problem. Thus, with a very long WUS, it may often not be possible to have sufficiently long data packets without just filling up the packets with dummy bits. The possibility of boosting the power of the WUS therefore allows for more flexibility, where a significantly shorter WUS can be used with acceptable performance. The trade-off between a long sync word and increased power for the WUS is shown in FIG. 12B. FIG. 12B illustrates performance of the WUR 70 as a function of power offset of the WUS and the length of the WUS.

The simulation results shown in this figure are based on sending the WUS on the center RU (RU5) in FIG. 1, and at the same time sending random user data on the remaining RUs (RU1-RU4 and RU6-RU9). The transmitting device 30 may be implemented in accordance with what is shown in FIG. 9. The receiving device 50 may be based on an envelope detector followed by a correlator, where the output from the envelope detector is correlated with the known sync word.

As is commonly known when it comes to detection of a signal, there is a trade-off between actually detecting the signal and erroneously declaring the signal to be present when it is actually absent. In FIG. 12B, the probability of detecting the sync word as well as the probability of false alarm are shown for four different lengths of the sync word. For each length of the sync word, a simulation is performed for power offset of the WUS in the range of 0 to 10 dB in steps of 1 dB. As an example, consider the curve corresponding to a length of 20 symbols. The different markers correspond to the different power offsets, where naturally the performance for the WUR is improved as the power offset increases. So, for 0 dB offset, which corresponds to the marker to the lower right, the probability of a false alarm is 18% whereas the probability of declaring the sync word as present is 0. Then, as the WUS is boosted in power, the performance is improved and when the WUS is boosted by 10 dB the probability of miss is decreased to about 1% at the same time as the probability of correctly detecting the sync word has increased to about 35%.

The curves for the other lengths of the sync word follow the same pattern, but with improved performance. In the case of a 200-symbol long sync word, with no power boosting, the probability of a false alarm is already about 1%, or the same as for the 20-symbol long sync word when boosted by 10 dB. Just boosting the WUS with 2-3 dB does, in this case, result in ideal performance, such as where the probability of detection is 1 at the same time that the probability of false alarm is 0.

Embodiments of the invention will be discussed for when they are applied to a specific system with specific parameters, to more easily describe the core of the invention. As would be obvious for anyone of ordinary skill in the art, the ideas presented here are easily adopted to other systems with potentially very different parameters.

Features of the first and second additional embodiments make use of the trade-off between power offset and the length of the sync word. Specifically, it is possible to use shorter sync words if the sync word is boosted. For example, first, when it is determined that a WUS is to be sent concurrently with user data, it is determined how long the packet will be. This is based on the user data to be transmitted. Second, based on the length of the packet, the length of the sync word is determined such that it is not longer than the actual data packets. Third, based on the length of the sync word, the WUS is boosted to obtain the desired performance.

Figure 13A:
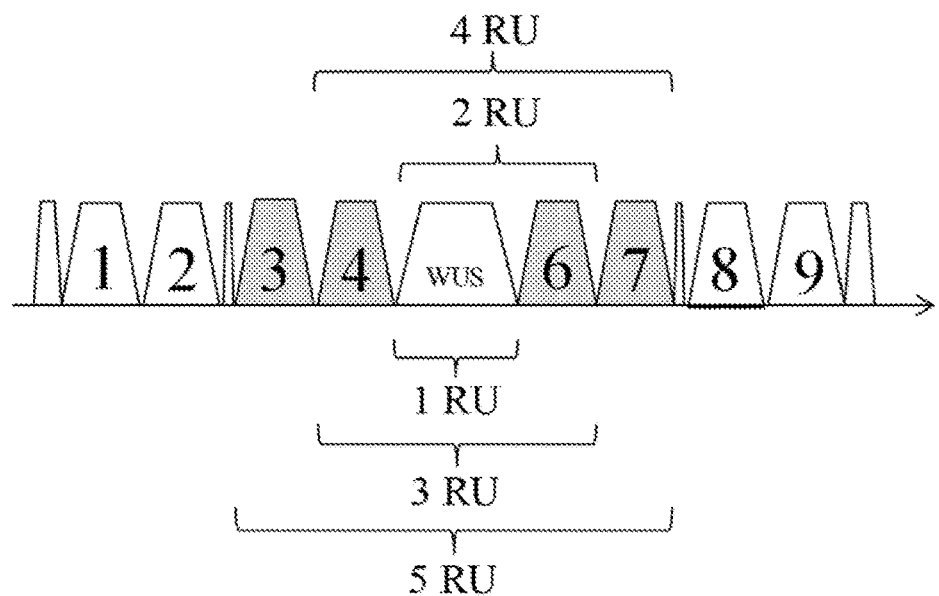
FIGS. 13A-13B illustrate the use and performance of multiple resource units (RU) for the WUS, according to some embodiments.
Figure 13B:
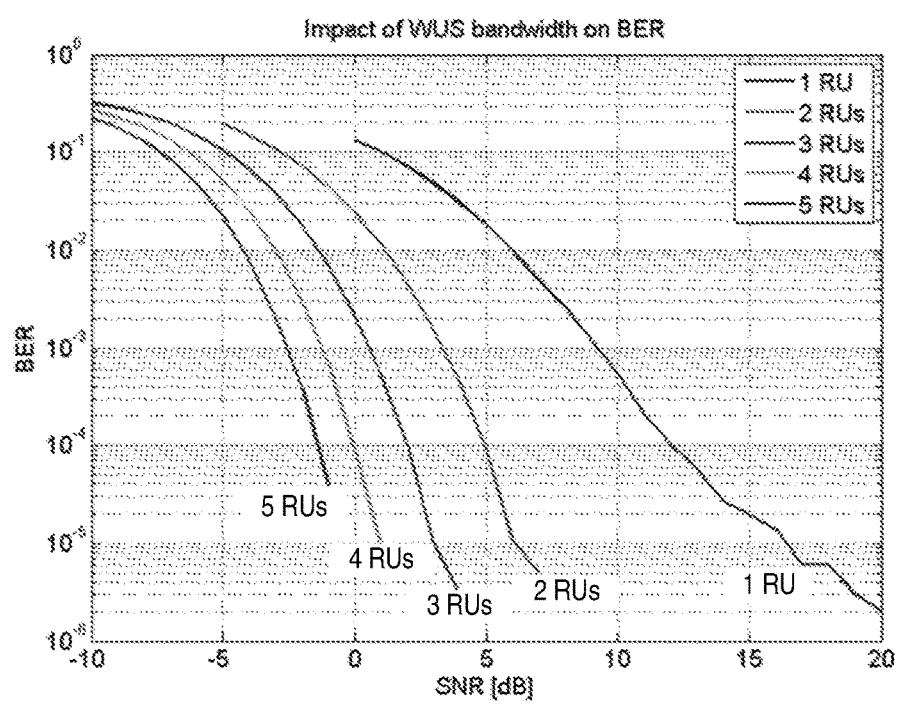

As an alternative way of keeping the resource allocation to the WUS fixed and boosting the power of this resource, one may alternatively and effectively achieve the power boosting by allocating more frequency resources while keeping the power constant for each resource. As an example, suppose that one wants to boost the power of the WUS by 3 dB compared to just sending the WUS on one RU. This can then be achieved by allocating two RUs for the WUS, thus reducing the number of RUs allocated for data. The number of RUs allocated to the WUS may change from one packet to the next or may be user dependent. For example, FIG. 13A illustrates the WUS as one RU, but where the WUS can be expanded to multiple RUs. FIG. 13B illustrates the impact of WUS bandwidth on the signal to noise ratio (SNR), where more RUs correspond to better performance. Notably, the RUs need not be contiguous in the frequency domain.

Other features covered by various embodiments of the present invention relate to how to select which RU or RUs to use for the WUS. One such feature related to changing the frequency that is used includes sending the WUS from one sync word to the next in order to achieve frequency diversity. Again, referring to FIG. 1, it could be that a specific RU that is sent on a frequency with poor channel conditions is in a dip. By changing which RU is used for the WUS, the probability of transmitting the WUS in a poor channel is reduced significantly.

Figure 14A:
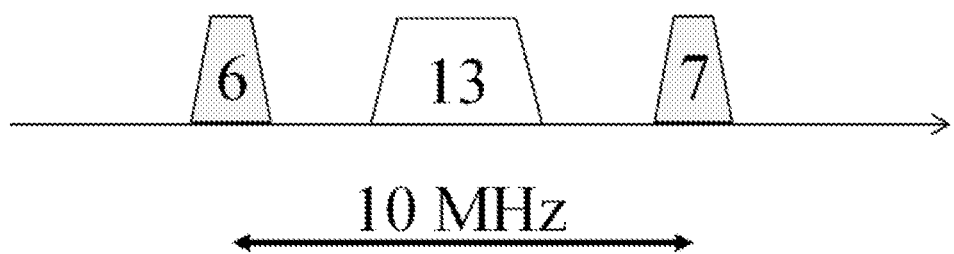
FIGS. 14A-14B illustrate the use and performance of non-contiguous RUs for the WUS, according to some embodiments.
Figure 14B:
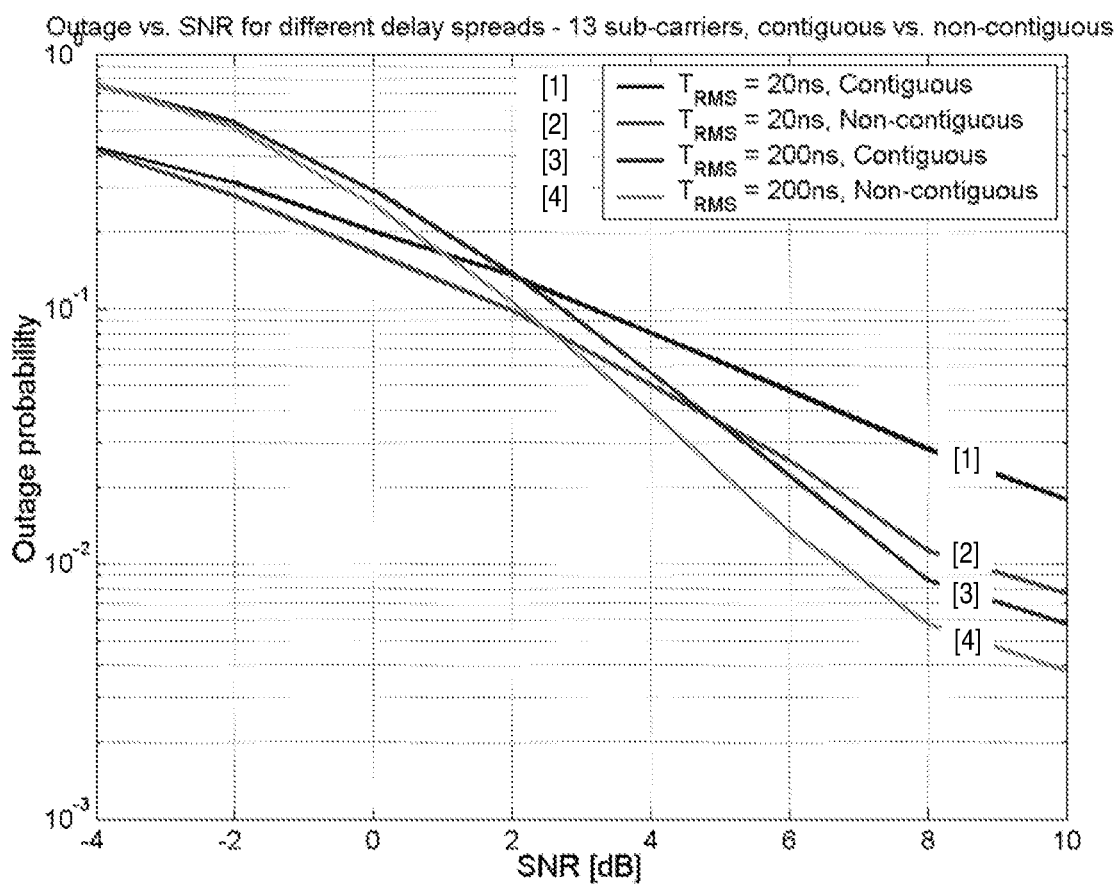

Frequency diversity may be explored for a single sync word by transmitting the WUS on two or more RUs at the same time. Here, the choice of RUs should preferably take the expected channel variations into account such that the two or more RUs are sufficiently separated in frequency for RUs to experience uncorrelated fading. For example, FIG. 14A shows RUs for the WUS separated in frequency. FIG. 14B shows the performance for different delay spreads, both contiguous and non-contiguous.

Another feature applicable to the second additional embodiment involves allocating the WUS to sub-carriers that are not used anyway. In essentially every system based on OFDM, there are some sub-carriers that are not used, neither for data nor as pilot symbols. Typical examples of this can be seen in FIG. 1.

Yet another feature applicable to the second additional embodiment relates to the situation where the system used for data does not support OFDMA, and merely supports OFDM. That is, there is no natural way to allocate a RU to the WUS. In this embodiment, the actual data signal is also made to contain the WUS. One way to address this is to basically decide to not use some of the sub-carriers for data in the OFDM symbols where the WUS is Off, and use it in the ordinary way when the WUS is On. This will naturally cause some minor degradation of the user data. However, if the WUS corresponds to ⅑th of the sub-carriers, so that when the WUS is Off, these ⅑th of the total number of sub-carriers are not used. Since it can be expected that coding and interleaving across frequency is applied, the only effect this has is that the total received power of the data is reduced by ⅑, which corresponds to a degradation of −10 log 10(8/9)=0.5 dB.

Some other example embodiments include a method for transmitting user data concurrently with a WUS where the user data and the WUS are so close in frequency that the WUS design should consider the impact the data signal has on the performance. In some cases, both the data and the WUS are generated simultaneously using an IFFT. The WUS may be allocated to one of the RUs that otherwise may have carried data. The RU allocated for the RU may be changed from transmitting one WUS to the next, in order to obtain frequency diversity.

In some cases, two or more RUs may be allocated to the WUS in order to obtain frequency diversity. These two or more RUs may be allocated in such a way that the expected channel conditions are uncorrelated.

The WUS is boosted in power (sent at higher power spectrum density) than the remaining RUs used for data. The duration of the WUS may be selected based on the duration of the data part of the packet, and where the duration of the WUS is less or equal to the duration of the data part of the packet. The amount of boosting may be at least in part based on the length of the WUS, and the amount of boosting may be a non-increasing function of the duration of the WUS.

In some cases, the WUS is allocated two or more RUs, where the RUs are not necessarily contiguous in the frequency domain, and the number of RUs may change from one packet to the next, depending on the number of users that need to be served by the access point (AP), and on the channel conditions experienced by the WUR.

Figure 15:
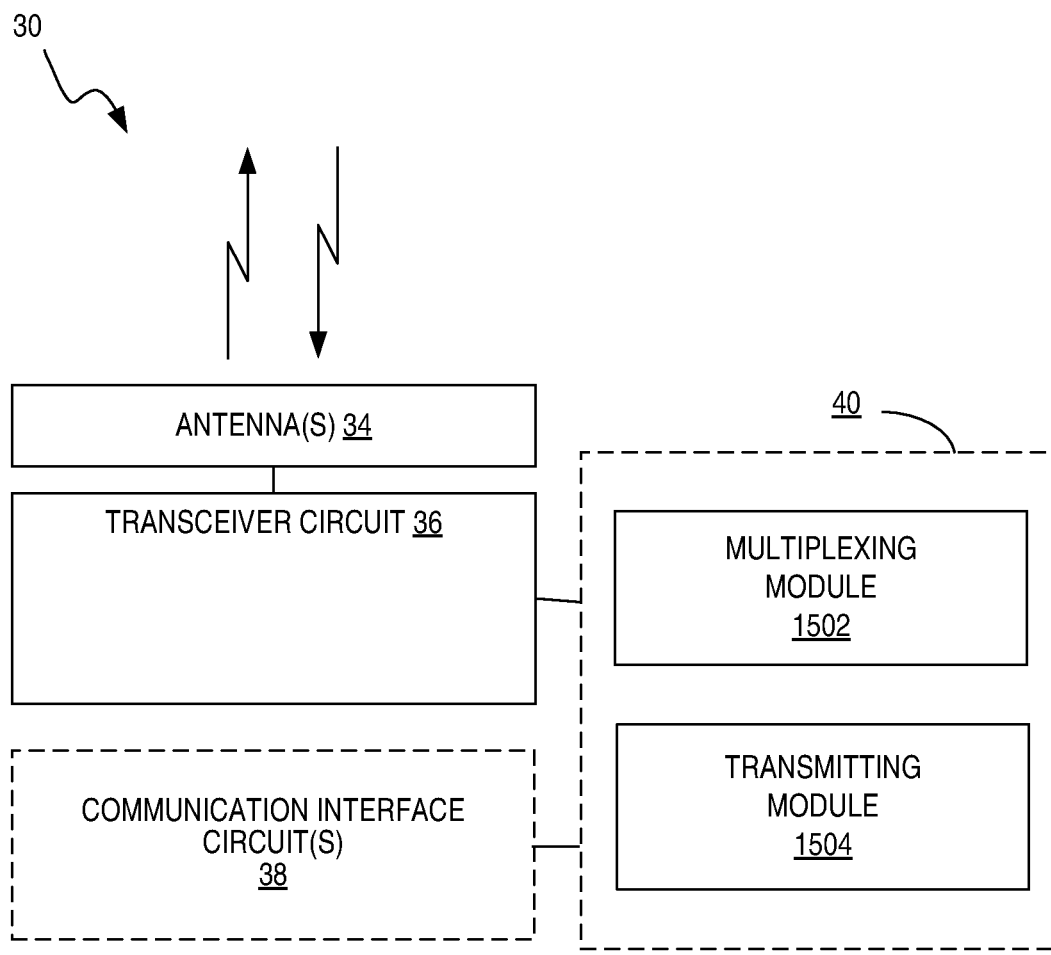
FIG. 15 is a block diagram illustrating a functional implementation of a transmitting device, according to some embodiments.

FIG. 15 illustrates an example functional module or circuit architecture as may be implemented in the transmitting device 30. The illustrated embodiment at least functionally includes a multiplexing module 1502 for frequency-division multiplexing a WUS targeted to a wake-up receiver of a first receiving device with user data targeted to a main transceiver of each of one or more other receiving devices into an output signal. The implementation also includes a transmitting module 1504 for transmitting the output signal.

Figure 16:
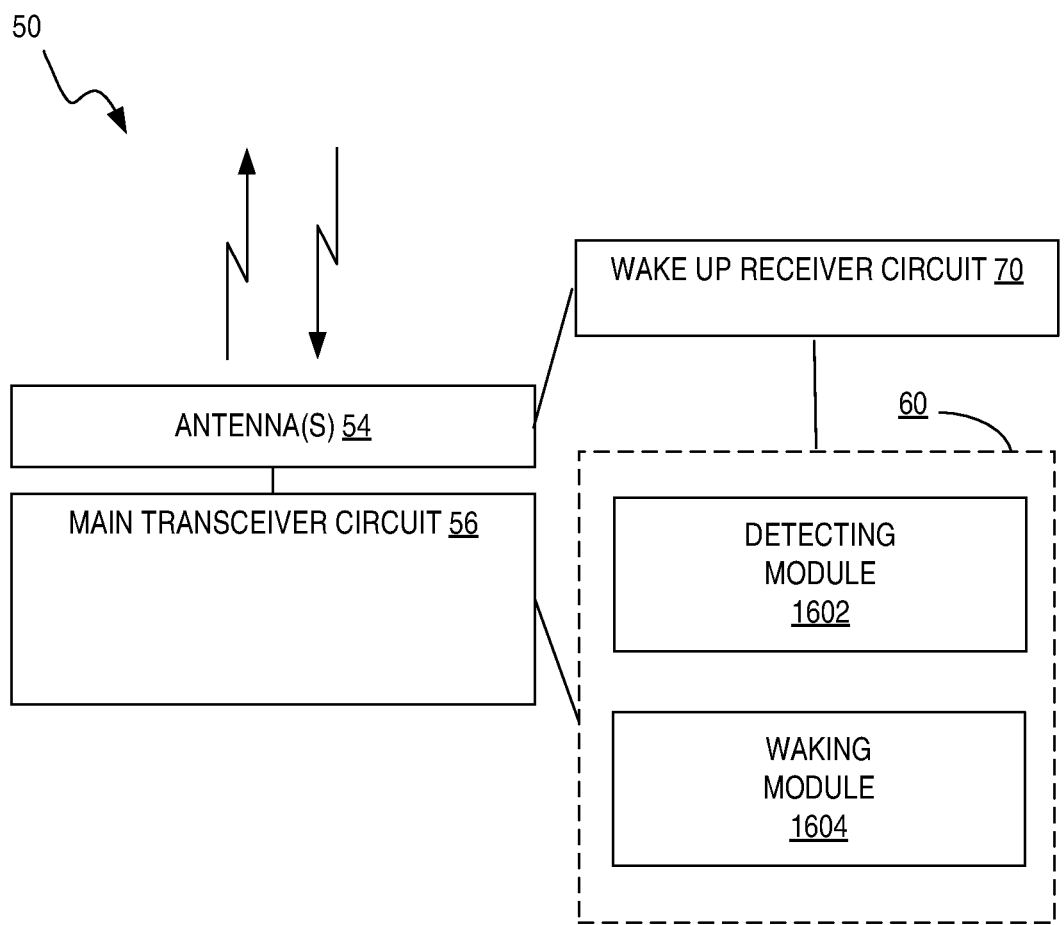
FIG. 16 is a block diagram illustrating a functional implementation of a receiving device, according to some embodiments.

FIG. 16 illustrates an example functional module or circuit architecture as may be implemented in the receiving device 50. The illustrated embodiment at least functionally includes a detecting module 1602 for detecting, at the WUR, a WUS targeted for the WUR in a received signal, where the WUS is frequency-division multiplexed with user data for one or more other receiving devices. The implementation also includes a waking module 1604 for waking up the main transceiver in response to the detecting.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed herein and that modifications and other embodiments are intended to be included within the scope of this disclosure. Although specific terms may be employed herein, they are used in a generic and descriptive sense only and not for purposes of limitation.

What is claimed is:

1. A method in a transmitting device, comprising:
   frequency-division multiplexing a wake-up signature (WUS) targeted to a wake-up receiver (WUR) of a first receiving device with user data targeted to a main transceiver of each of one or more other receiving devices into an output signal,
      wherein the frequency-division multiplexing comprises allocating, in the frequency domain, multiple resource units for sending the WUS that are not contiguous in the frequency domain, and
      wherein a number of the multiple resource units for sending the WUS change from one packet to the next depending on channel conditions experienced by the WUR and a number of users that need to be served; and
   transmitting the output signal.

2. The method of claim 1, further comprising:
   modulating the WUS using on-off keying (OOK) to obtain an OOK signal, such that the OOK signal occupies a first frequency range of the output signal and the frequency-division multiplexed user data occupies a second frequency range of the output signal.

3. The method of claim 1, wherein frequency-division multiplexing the WUS with user data comprises:
   generating an Orthogonal Frequency-Division Multiplexed (OFDM) signal in which the user data is carried by one or more resource units of the OFDM signal; and
   multiplexing the WUS signal in one or more other resource units of the OFDM signal, each resource unit comprising one or more subcarriers of the OFDM signal.

4. The method of claim 3, wherein the frequency-division multiplexing comprises allocating multiple resource units for the user data for every one resource unit allocated for the WUS.

5. The method of claim 3, wherein the frequency-division multiplexing comprises boosting a power of the WUS resource units relative to a power of the user data resource units, based on a length of a symbol used for the WUS.

6. The method of claim 3, wherein the frequency-division multiplexing comprises sending the WUS on a middle resource unit while sending the user data on resource units surrounding the middle resource unit.

7. The method of claim 3, wherein the frequency-division multiplexing comprises changing, from one time interval to another, a resource unit used for sending the WUS so as to obtain frequency diversity.

8. The method of claim 3, wherein the frequency-division multiplexing comprises allocating multiple resource units for sending the WUS.

9. The method of claim 1, further comprising modulating the WUS by:
   generating a first logical bit value for each of one or more WUS symbol durations by blanking subcarriers of a resource unit allocated to the WUS, for the respective WUS symbol duration; and
   generating a second logical bit value for each of one or more other WUS symbol durations by transmitting one or more constellation symbols with predetermined powers in subcarriers of the resource unit allocated to the WUS, for the respective symbol duration.

10. A method at a receiving device having a wake-up receiver (WUR) and a main transceiver, wherein the WUR uses less power than the main transceiver to listen for a wake-up signature (WUS) in order to wake up the main transceiver to receive user data, the method comprising:
    detecting, at the WUR, a WUS targeted for the WUR in a received signal,
       wherein the WUS is frequency-division multiplexed with user data for one or more other receiving devices by allocating, in the frequency domain, multiple resource units for sending the WUS that are not contiguous in the frequency domain, and
       wherein a number of the multiple resource units for sending the WUS change from one packet to the next depending on channel conditions experienced by the WUR and a number of users that need to be served; and
    waking up the main transceiver in response to detecting the WUS.

11. The method of claim 10, further comprising subsequently detecting user data in the received signal.

12. The method of claim 10, wherein detecting the WUS comprises detecting an envelope of an on-off-keying (OOK) signal in a first frequency range of the received signal.

13. The method of claim 10, wherein detecting the WUS comprises detecting the WUS from one or more resource units of a received Orthogonal Frequency-Division Multiplexed (OFDM) signal that carriers user data for one or more other receiving devices in other resource units, each resource unit comprising one or more subcarriers of the OFDM signal.

14. A transmitting device, comprising:
    transceiver circuitry configured to receive and transmit signals; and
    processing circuitry operatively associated with the transceiver circuitry and configured to:
       frequency-division multiplex a wake-up signature (WUS) targeted to a wake-up receiver (WUR) of a first receiving device with user data targeted to a main transceiver of each of one or more other receiving devices into an output signal, wherein the frequency-division multiplexing comprises allocating, in the frequency domain, multiple resource units for sending the WUS that are not contiguous in the frequency domain, and wherein a number of the multiple resource units for sending the WUS change from one packet to the next depending on channel conditions experienced by the WUR and a number of users that need to be served; and transmit the output signal.

15. A receiving device, comprising:

main transceiver circuitry;

wake-up receiver (WUR) circuitry, wherein the WUR circuitry uses less power than the main transceiver circuitry to listen for a wake-up signature (WUS) in order to wake up the main transceiver circuitry to receive user data; and processing circuitry operatively associated with the main transceiver circuitry and the WUR circuitry, and configured to:

detect, at the WUR circuitry, a WUS targeted for the WUR circuitry, wherein the WUS is frequency-division multiplexed with user data for one or more other receiving devices in the received signal by allocating, in the frequency domain, multiple resource units for sending the WUS that are not contiguous in the frequency domain, wherein a number of the multiple resource units for sending the WUS change from one packet to the next depending on channel conditions experienced by the WUR and a number of users that need to be served; and wake up the main transceiver circuitry in response to detecting the WUS.

* * * * *